United States Patent
Streit et al.

(10) Patent No.: US 9,416,822 B2
(45) Date of Patent: Aug. 16, 2016

(54) ROLLING BEARING COMPONENT

(71) Applicant: SCHAEFFLER TECHNOLOGIES AG & CO. KG, Herzogenaurach (DE)

(72) Inventors: Edgar Streit, Poppenlauer (DE); Oskar Beer, Landshut (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/382,715

(22) PCT Filed: Mar. 7, 2013

(86) PCT No.: PCT/EP2013/054546
§ 371 (c)(1),
(2) Date: Sep. 3, 2014

(87) PCT Pub. No.: WO2013/143817
PCT Pub. Date: Oct. 3, 2013

(65) Prior Publication Data
US 2015/0049973 A1 Feb. 19, 2015

(30) Foreign Application Priority Data
Mar. 30, 2012 (DE) .......................... 10 2012 205 242

(51) Int. Cl.
*F16C 33/62* (2006.01)
*F16C 33/00* (2006.01)
*F16C 33/64* (2006.01)
*F16C 19/06* (2006.01)

(52) U.S. Cl.
CPC ................ *F16C 33/62* (2013.01); *F16C 33/64* (2013.01); *F16C 19/06* (2013.01); *F16C 2202/04* (2013.01); *Y10T 428/24983* (2015.01)

(58) Field of Classification Search
CPC ............ F16C 2202/04; F16C 2202/02; F16C 2223/14; F16C 2223/16; F16C 33/62; F16C 33/64; F16C 19/06; Y10T 428/24983
USPC .................. 384/492, 569, 625, 912, 913; 29/898.13; 428/217; 148/222, 238
See application file for complete search history.

(56) References Cited

U.S. PATENT DOCUMENTS

| 4,696,581 | A | * | 9/1987 | Tsushima | ............... F16C 33/30 384/491 |
| 5,361,648 | A | | 11/1994 | Murakami et al. | |
| 6,179,933 | B1 | * | 1/2001 | Dodd | ........................ C23C 8/38 148/222 |
| 6,224,686 | B1 | | 5/2001 | Toshinori et al. | |
| 7,377,988 | B2 | | 5/2008 | Traywick et al. | |
| 8,007,716 | B2 | | 8/2011 | Sumie et al. | |

(Continued)

FOREIGN PATENT DOCUMENTS

| CA | 2 583 207 | 2/2006 |
| CN | 102305245 A | 1/2012 |

(Continued)

*Primary Examiner* — Adam D Rogers
(74) *Attorney, Agent, or Firm* — Davidson, Davidson & Kappel, LLC

(57) ABSTRACT

A rolling bearing component (2, 3, 4) has the following features: a nitrided surface zone (5), with a nitrogen content decreasing from the outside inwards, and a core zone (6), internal compressive stresses decreasing from the outside inwards in the surface zone (5), a surface hardness of 870 to 2000 HV 0.3 at a depth of 0.04 mm, wherein—the hardness at a depth of 0.3 mm is not more than 250 HV 0.3 less than the surface hardness.

8 Claims, 3 Drawing Sheets

(56) References Cited

U.S. PATENT DOCUMENTS

| | | | |
|---|---|---|---|
| 8,070,364 B2 * | 12/2011 | Beer | F16C 33/32 |
| | | | 384/492 |
| 8,479,396 B2 * | 7/2013 | Streit | C22C 38/44 |
| | | | 148/228 |
| 2004/0071379 A1 | 4/2004 | Herve et al. | |
| 2006/0029318 A1 | 2/2006 | Beer et al. | |
| 2006/0056754 A1 | 3/2006 | Beer et al. | |
| 2010/0058592 A1 | 3/2010 | Streit et al. | |
| 2011/0250466 A1 * | 10/2011 | Muller | B22D 17/00 |
| | | | 428/609 |
| 2012/0020605 A1 * | 1/2012 | Mori | C21D 1/74 |
| | | | 384/558 |

FOREIGN PATENT DOCUMENTS

| | | |
|---|---|---|
| CN | 102348825 A | 2/2012 |
| CN | 102362000 A | 2/2012 |
| DE | 4311507 | 1/1994 |
| DE | 10222266 | 12/2003 |
| DE | 10 2006 025008 | 12/2007 |
| EP | 1489318 | 12/2004 |
| EP | 1774188 | 4/2007 |
| EP | 1788264 | 5/2007 |
| EP | 1774187 | 2/2010 |
| EP | 2159437 | 3/2010 |
| EP | 2 221 389 | 8/2010 |
| GB | 2250787 | 6/1992 |
| JP | 2003307223 | 10/2003 |

* cited by examiner

ROLLING BEARING COMPONENT

The present invention relates to a rolling bearing component, in particular a bearing ring of a rolling bearing.

BACKGROUND

Machine elements for rolling loads are known, for example, from EP 1 774 187 B1 and from EP 1 774 188 B1. These are rolling bearing elements, in particular bearing rings, made of a steel having a martensitic structure, the bearing rings including a thermochemically produced, nitrogen-enriched surface layer.

SUMMARY OF THE INVENTION

It is an object of the present invention to provide a rolling bearing component with respect to the prior art.

The present invention provides a rolling bearing. The rolling bearing component is preferably designed as a bearing ring and has the following features:
a nitrided surface zone having a nitrogen content which decreases from the outside to the inside;
a core zone having an at least approximately constant hardness;
residual compressive stresses in the surface zone which decrease from the outside to the inside;
a hardness of 870 HV 0.3 to 1,000 HV 0.3 at a depth of 0.04 mm, hereinafter also referred to as the surface hardness;
the hardness at a depth of 0.3 mm being maximal 250 HV 0.3 less than the surface hardness.

The present invention is based on the consideration that, in the case of safety-critical applications such as machine elements in aeronautics, not only a preferably long service life is required but also a high degree of damage tolerance. If an initially small, local defect occurs in the individual case, the operability of the machine element must be maintained at least until a safe shutdown of the corresponding device is possible (e.g., reaching the destination airport in the case of an airplane). For this purpose, not only a preferably early detectability of an incipient defect is necessary, but also a high damage tolerance of all components.

In the case of rolling bearing components having a nitrided surface zone, due to the fact that the hardness is limited to at least 870 HV 0.3 and at most 1,000 HV 0.3, according to the present invention, with respect to a depth of 40 μm, the residual stress curve is also limited to the extent that shear stresses arising in the event of a damage-induced interruption of the nitrided zone are limited in such a way that the spread of a defect under roll-over load does not take place significantly faster than in the case of a non-nitrided surface zone. The nitrided material would furthermore lose ductility as the hardness increases; a reduced ductility also means less resistance to the spread of a defect.

Due to the specified limits of surface hardness as well as the limiting of the maximum difference between the minimum hardness in the core zone and the surface hardness to 250 HV 0.3, a component is provided which optimally meets the requirements of high resistance to the development of a defect—sufficient hardness and residual compressive stresses—and simultaneously to the spread of a defect—high ductility and not excessively high residual stresses. At a depth of 0.3 mm, the hardness, specified as HV 0.3, is preferably more than 75%, in particular more than 80%, of the hardness at a depth of 0.04 mm. In an advantageous embodiment, the absolute value of the residual compressive stress on the surface of the rolling bearing component is at least 500 MPa and at most 1,000 MPa. The absolute value of the residual compressive stress at a depth of 0.05 mm is preferably less than 60%, in particular less than 50%, of the absolute value of the residual compressive stress on the surface.

The residual compressive stresses in the surface zone of the rolling bearing component exist at least in the mechanically unstressed state of the rolling bearing component.

In one preferred embodiment, the depth at which the nitrogen content in the surface zone falls below 80% of its maximum value corresponds to at least 1.75 times the depth, in particular at least twice the depth, for example three times the depth, at which the residual compressive stress is 80% of the maximum residual compressive stress.

The depth at which the nitrogen content in the surface zone drops below 80% of its maximum value, the so-called 80% nitrogen limit, preferably equals at most eight times the depth, in particular at most four times the depth, at which the residual compressive stress drops below the value of 80% of the maximum residual compressive stress in the surface zone (80% residual compressive stress limit). According to various possible specific embodiments, the 80% nitrogen limit is thus in the range between 1.75 times and four times or in the range between twice and four times or in the range between three times and four times or in the range between 1.75 times and eight times or in the range between twice and eight times or in the range between three times and eight times the 80% residual compressive stress limit.

Due to the aforementioned limitation of the hardness as well as hardness differences, with limits, simultaneously defined in the same way, of the progression of the residual compressive stresses as well as the nitrogen content, a rolling bearing component is provided which meets the competing requirements of toughness and hardness to the same extent. In particular, a high tolerance to the spread of a local interruption ("defect") of the nitrided zone under roll-over load as well as a long operating time under more difficult conditions (e.g., contamination in the oil flow) are provided.

The metallic material from which the rolling bearing component is manufactured is, for example, steel having the designation M50 (AMS 6490/6491, 80 MoCrV 42-16) or M50NIL (AMS 6278, 13 MoCrNiV 42-16-14). Other materials that may be used are indicated in the prior art cited at the outset.

BRIEF DESCRIPTION OF THE DRAWINGS

Exemplary embodiments of the present invention are explained in greater detail below on the basis of one drawing.

DETAILED DESCRIPTION

Figure 1:
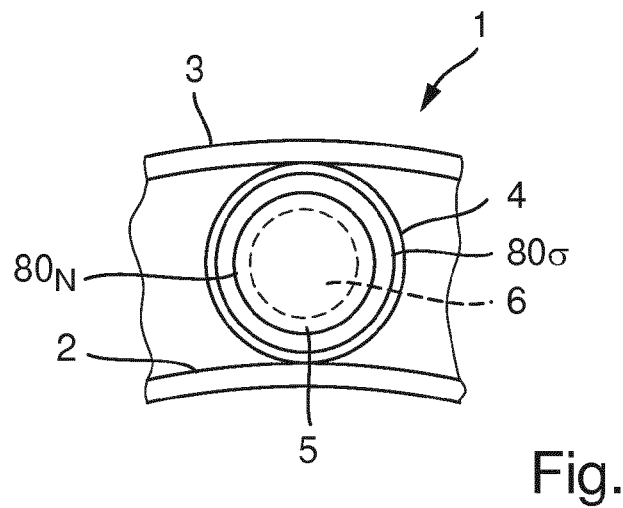
FIG. 1 shows a schematic sectional view of a first rolling bearing.

FIG. 1 shows a detail of a rolling bearing, which is identified as a whole by reference numeral 1, namely a ball bearing, including bearing rings 2, 3, namely an inner ring 2 and an outer ring 3, identified in general as rolling bearing components 2, 3, and rolling bodies 4, which are also subsumed under the term rolling bearing components. All rolling bearing components in this case are manufactured from metallic materials.

Each rolling body 4 is made of steel having a martensitic structure and includes a thermochemically produced, nitrided surface zone 5 as well as a core zone 6, which differs therefrom with respect to multiple parameters, in particular the chemical composition. The transition between surface zone 5 and core zone 6 is marked in FIG. 1 by a dashed line, whose position—like the entire representation—is not true to scale.

Residual compressive stresses, which decrease from the outside to the inside, exist within surface zone 5, the limit at which 80% of the maximum residual compressive stress has not fallen below being referred to as the 80% residual compressive stress limit and identified by $80_\sigma$ in the figure.

The nitrogen present in surface zone 5 also decreases from the surface of rolling body 4 to the inside. The limit at which 80% of the maximum nitrogen concentration has fallen below is referred to as the 80% nitrogen limit and identified by $80_N$ in the figure. Measured from the surface of rolling body 4, 80% nitrogen limit $80_N$ is situated at least 1.75 times as deep, for example twice as deep, in particular three times as deep, as 80% residual compressive stress limit $80_\sigma$. Within surface zone 5, the hardness of rolling body 4 is at least 870 HV 0.3 and at most 1,000 HV 0.3 with respect to a depth of 40 μm. The aforementioned depth of 40 μm is preferably between 80% residual compressive stress limit $80_\sigma$ and 80% nitrogen limit $80_N$. In core zone 6, the hardness is at most 250 HV 0.3 less than in surface zone 5.

Figure 2:
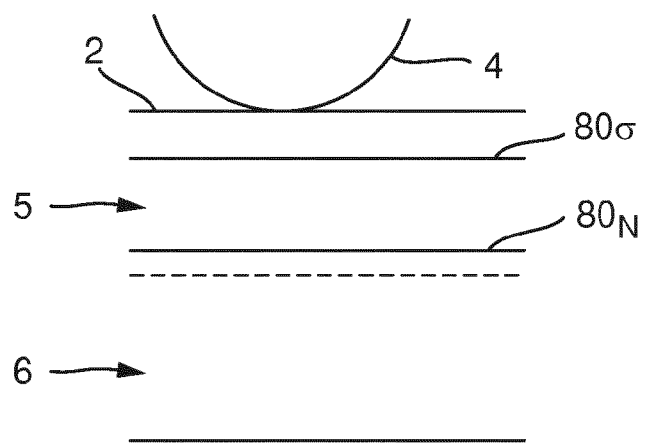
FIG. 2 shows a cross section of a bearing ring of a second rolling bearing.

Rolling bearing 1 according to FIG. 2 may be used, for example, as a bearing in a gas turbine. The characteristics of bearing rings 2, 3 of rolling bearing 1 according to FIG. 2 corresponds to the characteristics of rolling bodies 4 of the exemplary embodiment according to FIG. 1, where the material parameters described above are concerned. In this case, in particular, the hardness of rolling bearing component 2, 3, is also at least 870 HV 0.3 and at most 1,000 HV 0.3 at a depth of 40 μm. Likewise, the hardness of rolling bearing component 2, 3 is at most 250 HV 0.3 less at a depth of 0.3 mm 6 than in surface zone 5.

Figure 3:
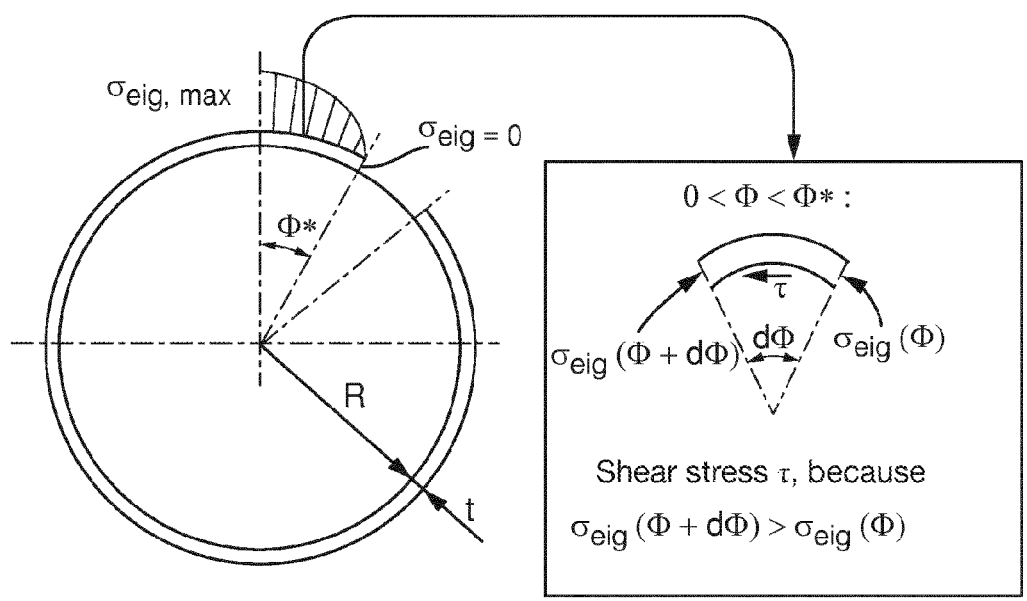
FIG. 3 shows a schematic view of the formation of shear stresses in an interruption of a layer subjected to residual stress.

FIG. 3 shows the derivation of the development of shear stresses in the case of an interrupted layer subjected to residual stress. Rolling bearing component 4 depicted in FIG. 3 is rolling body 4 of the exemplary embodiment according to FIG. 1, a defect in nitrided surface zone 5 being illustrated schematically in FIG. 3. Likewise, rolling bearing component 4 according to FIG. 3 may be a bearing ring 2, 3, as illustrated in FIG. 2. If the nitrogen-enriched layer, i.e., surface zone 5, is interrupted locally, as shown in FIG. 3, no stress acts upon the point of the interruption (exposed surface). Otherwise, the residual stress in this case is understood to be the mean value over the layer thickness.

Within a certain angle range φ*, the residual stress (normal stress) increases continuously up to the residual stress in the non-defective area. Within this area of rising residual stress, an additional shear stress τ must take effect for reasons of equilibrium. This additional shear stress τ facilitates the further development of a defect. The higher the residual compressive stress in surface zone 5, the higher the shear stress occurring in the event of a defect. The residual compressive stress in nitrided surface zone 5 of rolling bearing component 4, in turn, is in direct connection with the hardness generated.

Figure 4:
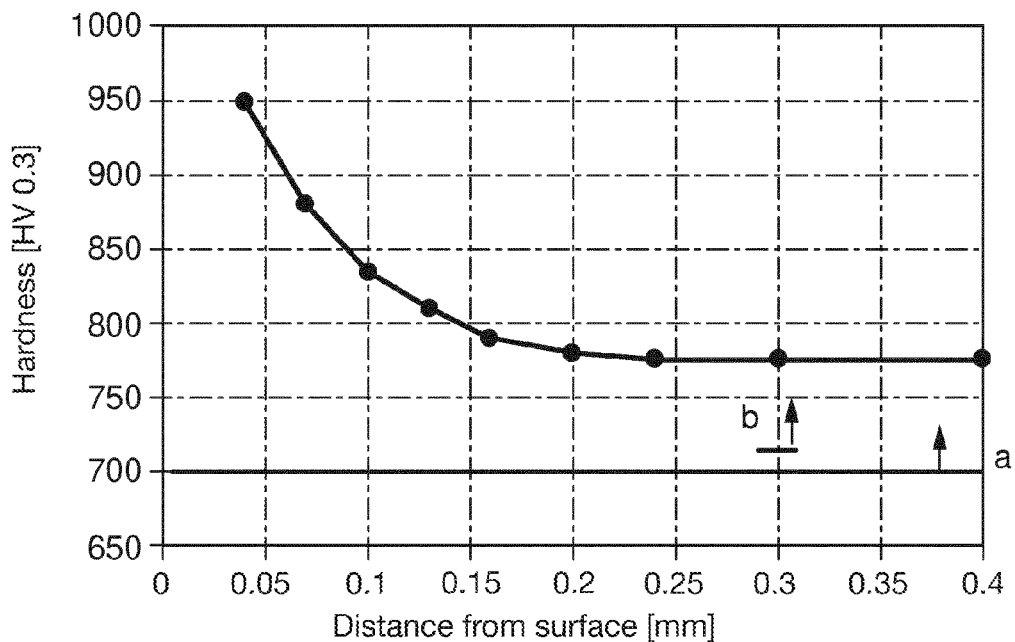
FIG. 4 shows a hardness profile of a rolling bearing component.

FIG. 4 shows the hardness curve of rolling bearing component 4 according to FIG. 3, in the case of a surface hardness according to the present invention. As shown in FIG. 4, the surface hardness is 950 HV 0.3. A hardness value reduced by 250 HV 0.3, i.e., 700 HV, is significantly exceeded in all areas of rolling bearing component 4 (see detail a in FIG. 3). Likewise, as illustrated in FIG. 4, the hardness at a depth of 0.3 mm, indicated in HV 0.3, is more than 75% of the hardness at a depth of 0.04 mm, i.e., of the surface hardness (detail b).

Figure 5:
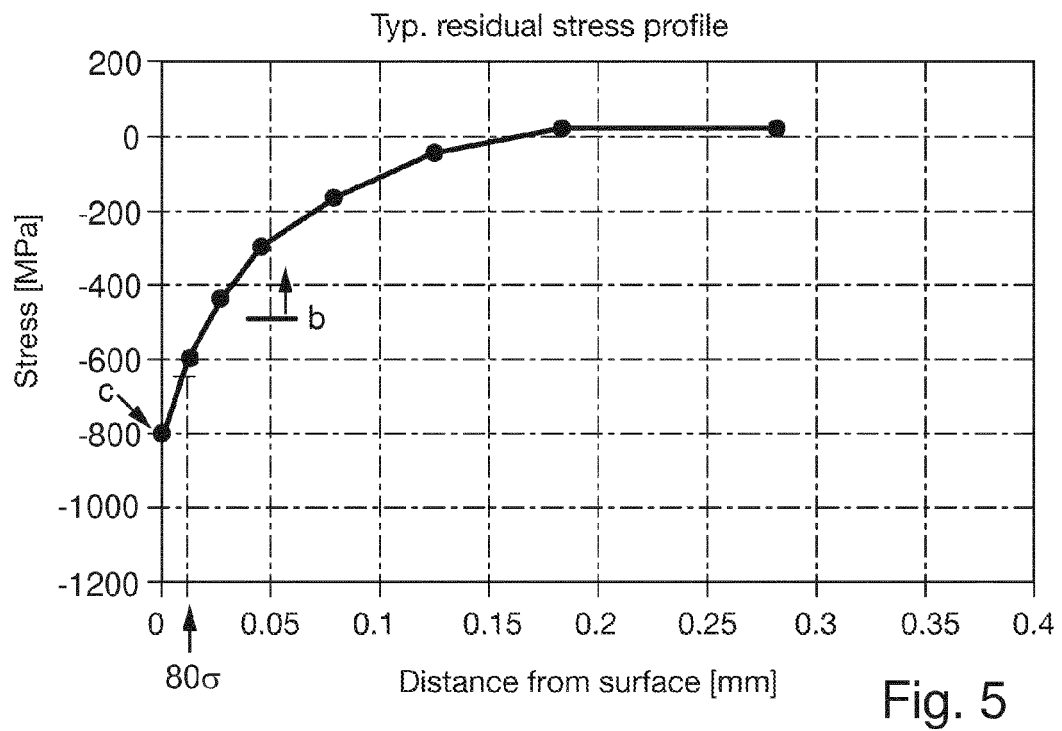
FIG. 5 shows a residual stress profile of the rolling bearing component according to FIG. 4.

FIG. 5 shows the residual stress curve within rolling bearing component 4 according to FIG. 3. On the surface of rolling bearing component 4, the residual compressive stress has an absolute value of 800 MPa (detail c). 80% residual compressive stress limit $80_\sigma$ is situated at a depth between 0.005 mm and 0.02 mm. At a depth of 0.05 mm, the absolute value of the residual compressive stress has already dropped to less than half the absolute value of the residual compressive stress on the surface of the workpiece (detail d). Very low residual tensile stresses, in terms of absolute value, are present at a depth >0.3 mm of rolling bearing component 4, compared to the residual compressive stresses in surface zone 5.

Figure 6:
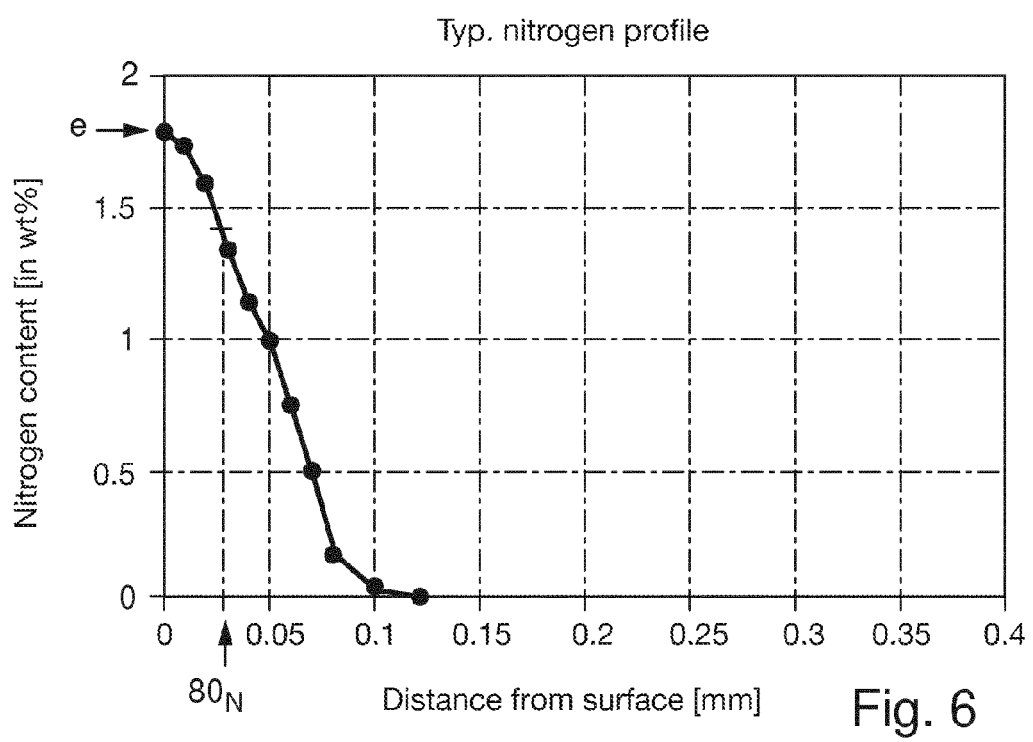
FIG. 6 shows a nitrogen profile of the rolling bearing component according to FIG. 4.

FIG. 6 shows the curve of the nitrogen content within rolling bearing component 4 according to FIG. 3. The nitrogen content on the surface of the workpiece is between 1.5% and 2.0% (detail e; indicated in wt %). The nitrogen content decreases continuously from the workpiece surface. 80% nitrogen limit $80_N$ is situated at a depth between 0.02 mm and 0.04 mm.

Nitrided surface zone 5 having the described properties delivers a very advantageous formation of hardness and residual compressive stress for roll-over loads, both during operation under more difficult conditions and in the event of local damage to this layer.

LIST OF REFERENCE NUMERALS

1 Rolling bearing
2 Bearing ring, rolling bearing component
3 Bearing ring, rolling bearing component
4 Rolling body, rolling bearing component
5 Surface zone
6 Core zone
$\sigma_{eig}$ Residual stress (general)
$\sigma_{eig,\,max}$ Residual stress in unaffected, nitrided layer
φ* Angle range in which the residual stress builds up
dφ Differential angle range
R Radius of the nitrided layer
t Thickness of the nitrided layer
τ Shear stress
$80_N$ 80% nitrogen limit
$80_\sigma$ 80% residual compressive stress limit

What is claimed is:
1. A rolling bearing component comprising:
 a nitrided surface zone having a nitrogen content decreasing from the outside to the inside;
 a core zone;
 an absolute value of residual compressive stresses in the surface zone decreasing from the outside to the inside;
 a hardness of 870 HV 0.3 to 1,000 HV 0.3 at a depth of 0.04 mm, the hardness at a depth of 0.3 mm being at most 250 HV 0.3 less than at a depth of 0.04 mm;
 wherein the hardness at a depth of 0.3 mm, indicated in HV 0.3, is more than 75% of the hardness at a depth of 0.04 mm;
 wherein the absolute value of the residual compressive stress on the surface is at least 500 MPa and at most 1,000 MPa;

wherein the absolute value of the residual compressive stress at a depth of 0.05 mm is less than 60% of the absolute value of the residual compressive stress on the surface.

2. The rolling bearing component as recited in claim 1 wherein the depth at which the nitrogen content in the surface zone falls below 80% of a maximum value corresponds to at least 1.75 times the depth at which the residual compressive stress is 80% of the maximum residual compressive stress.

3. The rolling bearing component as recited in claim 2 wherein the depth at which the nitrogen content in the surface zone falls below 80% of the maximum value corresponds to at most eight times the depth at which the residual compressive stress is 80% of the maximum residual compressive stress.

4. A bearing ring comprising the rolling bearing component as recited in claim 1.

5. A rolling body comprising the rolling bearing component as recited in claim 1.

6. A rolling bearing comprising the rolling bearing component as recited in claim 1.

7. The roller bearing component as recited in claim 1 wherein the absolute value of the residual compressive stress at a depth of 0.05 mm is less than half of the absolute value of the residual compressive stress on the surface.

8. A rolling bearing component comprising:
 a nitrided surface zone having a nitrogen content decreasing from the outside to the inside;
 a core zone;
 an absolute value of residual compressive stresses continually decreasing from the surface to at least a depth of 0.1 mm; and
 a hardness of 870 HV 0.3 to 1,000 HV 0.3 at a depth of 0.04 mm, the hardness at a depth of 0.3 mm being at most 250 HV 0.3 less than at a depth of 0.04 mm, wherein the absolute value of the residual compressive stress at a depth of 0.05 mm is less than 60% of the absolute value of the residual compressive stress on the surface.

* * * * *